Jan. 19, 1932.         J. E. BATIE         1,842,141
                    BALANCED VEHICLE WHEEL
                      Filed Oct. 12, 1925
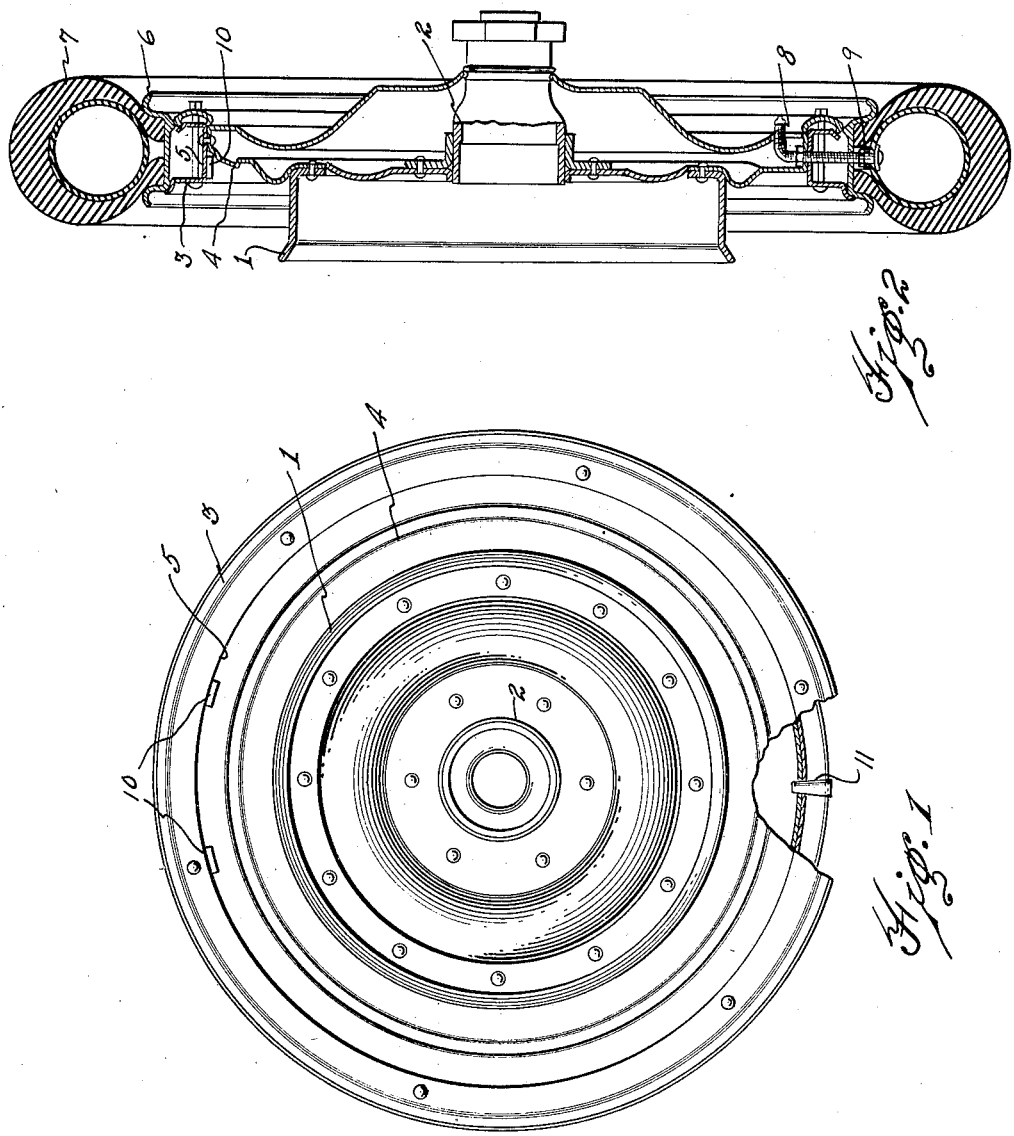
INVENTOR.
JOSEPH E. BATIE
BY
ATTORNEYS Patented Jan. 19, 1932

1,842,141

UNITED STATES PATENT OFFICE

JOSEPH E. BATIE OF DETROIT, MICHIGAN, ASSIGNOR TO KELSEY-HAYES WHEEL CORPORATION, OF DETROIT, MICHIGAN, A CORPORATION OF NEW YORK

BALANCED VEHICLE WHEEL

Application filed October 12, 1925. Serial No. 62,122.

The invention relates to vehicle wheels and has for its object the provision of a balanced vehicle wheel. Another object is to provide means upon the wheel body for compensating for the unbalanced condition of the pneumatic tire carried by the wheel. A further object is to provide an efficient method of balancing the wheel, which includes as one of its steps the relative adjustment of a pair of counterbalancing weights of a predetermined size to secure the balanced condition of the wheel, thereby avoiding the necessity of using different counterbalancing weights to overcome the different unbalanced conditions met in different vehicle wheels. With these as well as other objects in view the invention resides in the novel features as more fully hereinafter set forth.

In the drawings:—

Figure 1 is a rear side elevation partly in section of a vehicle wheel embodying my invention;

Figure 2 is a transverse section therethrough.

Pneumatically treaded wheels as generally made heretofore have been unbalanced owing principally to the fact that the pneumatic tires have been unbalanced owing to the valve stem and the means for clamping the valve stem, such as the bridge plate, to the tube of the tire. My vehicle wheel is balanced by providing for the unbalanced condition of the pneumatic tire. Furthermore I use standard counterbalancing weights, thereby avoiding the necessity of determining the particular size of weight required to place each wheel in balance.

As shown in the present instance, the body of the vehicle wheel embodying my invention is formed of the brake drum 1 mounted upon and secured to the hub 2, the permanent rim or felly 3 and the spacer 4, preferably formed of an annular disk which connects the permanent rim or felly to the brake drum, the point of connection of the spacer to the permanent rim or felly being positioned forward of the rear side of the permanent rim or felly to provide an unobstructed inner surface 5 upon the base of the permanent rim or felly in rear of the spacer. 6 is the demountable rim carrying the pneumatic tire 7, which has the valve stem 8 and suitable means for clamping the valve stem, including the bridge plate 9, to the tire tube. This valve stem extends radially through the demountable rim as well as the base of the permanent rim or felly when the tire is mounted upon the wheel.

For compensating for the unbalanced condition of the pneumatic tire, which is primarily produced by the valve stem and its clamping means, the wheel has secured thereto the pair of predetermined counterbalancing weights 10 of the same size and located to exert an opposing force to that exerted by the valve stem and its clamping means to balance the wheel when the pneumatic tire is mounted thereon. The combined weight of these counterbalancing weights is at least equal to and preferably greater than the combined weight of the valve stem and its clamping means when the two weights are diametrically opposite the valve stem and its clamping means. These weights are preferably secured to the unobstructed inner surface 5 of the permanent rim or felly 3 in the rear of the spacer by suitable means such as spot welding, whereby these weights are concealed and furthermore during the rotation of the wheel are subjected to centrifugal force tending to hold the weights against the permanent rim or felly.

The wheel is preferably balanced to compensate for the unbalanced condition of the pneumatic tire before the latter is mounted upon the wheel. This is done by rotatably mounting the hub of the wheel upon a suitable journal and securing the weight 11 of predetermined size in the nature of a plug in the hole of the permanent rim or felly through which the valve stem passes, this weight being equivalent to the combined weight of the valve stem and its clamping means. The wheel is then allowed to come to rest and the pair of counterbalancing weights 10 are temporarily secured upon the unobstructed inner surface of the permanent rim or felly substantially equi-distant from and on opposite sides of its uppermost point. These counterbalancing weights are adjusted toward or away from each other, remaining substantially equi-distant from the uppermost point, until the wheel is balanced. Then the positions of these weights are carefully indicated on the permanent rim or felly and they or corresponding weights are permanently secured by spot welding. The weight 11 is then removed and the vehicle wheel is in an unbalanced condition opposed to that of the tire to compensate for the latter when applied to the vehicle wheel, whereby the pneumatically treaded vehicle wheel is properly balanced.

While I have illustrated my invention as applied to a vehicle wheel having a pneumatic tire mounted thereon, I wish it to be understood that the invention in its broader scope is applicable to vehicle wheels without reference to the pneumatic tires, since balanced pneumatic tires may be manufactured.

What I claim as my invention is:

The method of balancing a vehicle wheel to compensate for the unbalanced condition of a pneumatic tire when placed upon the wheel, which includes securing a weight to the wheel on the same side as and equivalent to the weight by which the tire is unbalanced, temporarily securing a pair of counterbalancing weights of a predetermined size to the side of the wheel opposite that in which the center of mass of the wheel is located, relatively adjusting the pair of counterbalancing weights to shift the center of mass of the wheel to its axis of rotation, and permanently securing the counterbalancing weights in their adjusted positions.

In testimony whereof I affix my signature.

JOSEPH E. BATIE.